United States Patent
Jung et al.

(10) Patent No.: US 9,724,648 B2
(45) Date of Patent: Aug. 8, 2017

(54) HYBRID POROUS STRUCTURED MATERIAL, METHOD OF PREPARING HYBRID POROUS STRUCTURED MATERIAL, MEMBRANE INCLUDING HYBRID POROUS STRUCTURED MATERIAL, AND WATER TREATMENT DEVICE INCLUDING MEMBRANE INCLUDING HYBRID POROUS STRUCTURED MATERIAL

(71) Applicant: Samsung Electronics Co., Ltd., Suwon-Si, Gyeonggi-Do (KR)

(72) Inventors: Bo Kyung Jung, Yongin-si (KR); Sung Soo Han, Hwaseong-si (KR); Pil Jin Yoo, Seoul (KR); Do Kyung Rhee, Incheon-si (KR)

(73) Assignees: Samsung Electronics Co., Ltd., Gyeonggi-Do (KR); Research & Business Foundation Sungkyunkwan University, Gyeonggi-Do (KR)

( * ) Notice: Subject to any disclaimer, the term of this patent is extended or adjusted under 35 U.S.C. 154(b) by 141 days.

(21) Appl. No.: 14/257,278

(22) Filed: Apr. 21, 2014

(65) Prior Publication Data

US 2014/0353240 A1  Dec. 4, 2014

(30) Foreign Application Priority Data

May 31, 2013 (KR) .................. 10-2013-0063040

(51) Int. Cl.
*B01D 39/00* (2006.01)
*B01D 39/14* (2006.01)
(Continued)

(52) U.S. Cl.
CPC ............. *B01D 69/02* (2013.01); *B01D 69/10* (2013.01); *B29C 67/202* (2013.01)

(58) Field of Classification Search
CPC ...... B01D 67/0088; B01D 37/02; B01J 20/14; B29C 67/202
See application file for complete search history.

(56) References Cited

U.S. PATENT DOCUMENTS

2009/0020897 A1* 1/2009 Winkler ................ B82Y 20/00
264/1.22

FOREIGN PATENT DOCUMENTS

CN 101919591 A 12/2010
JP H03106948 A 5/1991
(Continued)

OTHER PUBLICATIONS

Kim et al., "Fabrication of TiO2 nanospheres by template replication in porous carbon networks", Journal of Materials Research, Apr. 2003, vol. 18, No. 4, p. 780-783.*

(Continued)

*Primary Examiner* — Ana Fortuna
(74) *Attorney, Agent, or Firm* — Harness, Dickey & Pierce, P.L.C.

(57) ABSTRACT

A hybrid porous structured material may include a porous region and a non-porous region. The porous region may include an imaginary stacked structure, wherein a plurality of imaginary spherical bodies/cavities are stacked so as to contact each other in three-dimensional directions. The non-porous region fills the gaps between the imaginary spherical bodies. A spherical colloid particle is present in each of the plurality of imaginary spherical bodies in the porous region. A separation membrane may include the hybrid porous structured material. A water treatment device may include the membrane.

13 Claims, 8 Drawing Sheets

(51) Int. Cl.
*B01D 29/00* (2006.01)
*B01D 24/00* (2006.01)
*B01D 29/46* (2006.01)
*B01D 69/02* (2006.01)
*B29C 67/20* (2006.01)
*B01D 69/10* (2006.01)

(56) References Cited

FOREIGN PATENT DOCUMENTS

| | | |
|---|---|---|
| JP | H07110906 A | 4/1995 |
| KR | 2010-0079630 A | 7/2010 |
| KR | 2013-0059869 A | 6/2013 |

OTHER PUBLICATIONS

Guilants et al. "Ordered mesoporous and macroporous inorganic films and membranes", Journal of Membrane Science, Jun. 2004, vol. 235, Iss. 1-2, p. 53-72.*

Wolf, Cornel, Geb.in Erfurt , "Structure Antibody Surfaces for Bio-Recognition and a Label-free Detection of Bacteria", am Fachbereich Biologieder Johannes Gutenberg-Universität in Mainz, 2010, p. 1-165.

Yeo, Seon Ju et al., "Layer-by-Layer Assembly of Polyelectrolyte Multilayers in Three-Dimensional Inverse Opal Structured Templates," ACS Appl. Mater. Interfaces, 2012, 4 (4), p. 2107-2115, American Chemcial Society.

Wang, Xinying et al., "Inverse colloidal crystal ultrafiltration membranes," Separation and Purification Technology, 2012, p. 33-41, vol. 93, Elsevier B.V.

* cited by examiner

HYBRID POROUS STRUCTURED MATERIAL, METHOD OF PREPARING HYBRID POROUS STRUCTURED MATERIAL, MEMBRANE INCLUDING HYBRID POROUS STRUCTURED MATERIAL, AND WATER TREATMENT DEVICE INCLUDING MEMBRANE INCLUDING HYBRID POROUS STRUCTURED MATERIAL

CROSS-REFERENCE TO RELATED APPLICATION

This application claims priority under 35 U.S.C. §119 to Korean Patent Application No. 10-2013-0063040, filed in the Korean Intellectual Property Office on May 31, 2013, the entire contents of which are incorporated herein by reference.

BACKGROUND

1. Field

The present disclosure relates to a hybrid porous structured material, a method of preparing the hybrid porous structured material, a separation membrane including the hybrid porous structured material, and a water treatment device including the separation membrane.

2. Description of the Related Art

A membrane including pores may be used to separate a material of a specific size. Such a membrane may be applied to water treatment by removing pollutants using this property. The membrane that may be used for water treatment may be divided into a microfiltration membrane, an ultrafiltration membrane, a nanofiltration membrane, a reverse osmotic membrane, and the like according to the size of micropores present on the surface.

The characteristics of a membrane are determined according to the characteristics of pores formed inside. For example, if the porosity of a membrane is relatively high, driving pressure may be decreased, but its physical strength may be reduced. On the other hand, if the porosity is decreased in order to increase the physical strength of a membrane, the driving pressure may be increased. Furthermore, the selective separation of a material having a specific size may be improved by narrowing the size distribution of the pores formed in a membrane.

SUMMARY

Some example embodiments of the present disclosure relate to a hybrid porous structured material that is capable of being controlled in terms of pore shapes and sizes with relative ease, and thus may be applied to various separation membranes due to uniform pore distribution.

Some example embodiments of the present disclosure relate to a separation membrane including the hybrid porous structured material.

Some example embodiments of the present disclosure relate to a method of preparing the hybrid porous structured material.

Some example embodiments of the present disclosure relate to a forward osmosis water treatment device including the separation membrane.

In one example embodiment, a hybrid porous structured material may include a porous region including an imaginary stacked structure where a plurality of imaginary spherical bodies/cavities are stacked so as to contact each other in three-dimensional directions, and a non-porous region that fills gaps between the imaginary spherical bodies, wherein each of spherical colloid/core particles is present in each of the plurality of imaginary spherical bodies in the porous region. For instance, the hybrid porous structured material may include a base framework defining a plurality of spherical cavities therein, the plurality of spherical cavities being adjacent to and in communication with each other; and a spherical core particle in each of the plurality of spherical cavities.

The plurality of imaginary spherical bodies may be stacked in a closest packing structure to form the imaginary stacked structures.

A region where the plurality of imaginary spherical bodies contact each other may provide nanopores where the imaginary spherical bodies are connected to adjacent imaginary spherical bodies in the porous structure.

The spherical colloid particle has a smaller diameter than the diameter of the imaginary spherical bodies and a larger diameter than the diameter of the nanopores formed by contacting the imaginary spherical bodies to each other.

The imaginary spherical bodies may have an average diameter of about 10 nm to about 100 μm.

The nanopores formed by contacting the imaginary spherical bodies may have an average diameter of about 1 nm to about 500 nm.

The hybrid porous structured material may have a porosity of about 0.1 to about 95 volume %.

The non-porous region may include one selected from an inorganic oxide, a thermoplastic resin, a curable resin, and a combination thereof.

The spherical colloid particle may include one selected from a thermoplastic resin, a curable resin, or a combination thereof.

The hybrid porous structured material may have a shape of a membrane having two surfaces facing each other and a thickness, wherein each of the two surfaces may include the non-porous region and a region formed from the cross-sectional surface of the imaginary spherical bodies.

In the two surfaces, the non-porous region may be occupied at about 1 to about 95% based on each area of the entire surface.

The wall surface of the membrane in the thickness direction may consist of the non-porous region.

The thickness of the membrane may be about 10 nm to about 1000 μm.

In another example embodiment of the present disclosure, a method of preparing a hybrid porous structure material may include stacking a plurality of spherical particles including a core layer and a shell layer formed on the surface of the core layer so as to contact each other in three-dimensional directions; injecting a liquid material for a non-porous membrane to fill gaps between the plurality of spherical particles and curing the same to provide a non-porous structured material; and removing the shell layer of the spherical particles.

The preparing method may further include removing a part of the non-porous structured material to expose a part of the plurality of spherical particles in the structured material after providing the non-porous structured material.

In the preparing method, the material for the shell layer of the plurality of spherical particles is different from the material for the non-porous structured material injected for filling gaps between the plurality of spherical particles.

In the preparing method, the material for the shell layer of the plurality of spherical particles may be different from the material for the core layer of the spherical particles.

Specifically, the material for the shell layer may be silica ($SiO_2$), and the material for the core layer may consist of an organic polymer resin.

In yet another example embodiment of the present disclosure, a separation membrane including the hybrid porous structured material is provided.

The separation membrane may further include a support, and may be formed as a composite membrane.

The separation membrane may be a microfiltration (MF) membrane, an ultrafiltration (UF) membrane, a nanofiltration (NF) membrane, or a reverse osmotic (RO) membrane.

In yet another example embodiment of the present disclosure, a water treatment device including the separation membrane is provided.

The water treatment device may be a reverse osmosis water treatment device.

DETAILED DESCRIPTION

This disclosure will be described more fully hereinafter in the following detailed description, in which some but not all embodiments of this disclosure are described. It should be understood that this disclosure may be embodied in many different forms and should not be construed as limited to the example embodiments set forth herein.

As those skilled in the art would realize, the described embodiments may be modified in various different ways, all without departing from the spirit or scope of this disclosure.

The size and thickness of each constituent element as shown in the drawings may have been randomly indicated and may have been exaggerated to facilitate a better understanding and ease of description, and this disclosure is necessarily limited to as shown.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms, "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

A hybrid porous structured material according to one example embodiment of the present disclosure may include a porous region consisting of an imaginary stacked structure where a plurality of imaginary spherical bodies are stacked so as to contact each other in three-dimensional directions, and a non-porous region that fills gaps between the imaginary spherical bodies, wherein each spherical colloid particle is present in each of the plurality of imaginary spherical bodies in the porous region. For instance, a hybrid porous structured material may include a base framework defining a plurality of spherical cavities therein, the plurality of spherical cavities being adjacent to and in communication with each other; and a spherical core particle in each of the plurality of spherical cavities. A spherical core particle may occupy about 50 to 90% of a volume of a respective spherical cavity containing it (e.g., 60 to 80%).

The term "spherical body" in the specification means not only a completely spherically-shaped body, but also means a spherical-like-shaped body possibly provided during the method of preparing a hybrid porous structured material described later.

As described above, since the hybrid porous structured material may be formed by a plurality of imaginary spherical bodies that are stacked so as to contact each other in three-dimensional directions to form an imaginary stacked structure, the imaginary spherical bodies in the porous structured material may form nanopores connecting with adjacent imaginary spherical bodies.

Theoretically, when two perfect spheres contact, they may meet at the contact point, but when a hybrid porous material is prepared according to one example embodiment of the present disclosure, the colloid particles introduced for providing a plurality of imaginary spherical bodies may be compressed and stacked somewhat in order to provide nanopores in the non-porous region in the area where the plurality of imaginary spherical bodies are contacted/tangential to each other, or the colloid particles may be compressed as required while providing the non-porous region so as to provide nanopores having an appropriate size. Alternatively, in the case that the imaginary spherical bodies do not have the completely spherical shape, nanopores may be formed at the non-porous region in the area where these imaginary spherical bodies are in contact with each other. In this case, as the shapes of the imaginary spherical bodies are stacked so as to contact each other in three-dimensional directions, a plurality of nanopores may be formed on one spherical shaped particle.

As the hybrid porous structured material includes spherical colloid particles (e.g., spherical core particles) in each of the plurality of imaginary spherical bodies (e.g., spherical cavities), each colloid particle has a smaller diameter than the diameter of the imaginary spherical body and a larger diameter than that of the nanopores formed by contacting the imaginary spherical bodies to each other.

The imaginary spherical bodies may have an average diameter of about 10 nm to about 100 μm.

In one example embodiment, in a template including macropores having an inverse-opal structure, the hybrid porous structured material may be realized in a form in which a spherical colloid particle is present in each macropore.

With the above-mentioned structure, the volume of the porous region in the imaginary spherical bodies may be controlled by adjusting the size of the colloid particles present in the imaginary spherical bodies.

The hybrid porous structured material may be applied to a separation membrane, and the pore size may be controlled according to the kind of separation membrane, so the macropore size in the hybrid porous structured material may be controlled by adjusting the size of each of the imaginary spherical bodies, and the volume of the porous region of the macropores may be controlled by adjusting the size of the colloid particles. As will be explained later, the colloid particle size may be controlled with relative ease and the size may be uniformly maintained, so the macropore size may be controlled with relative ease according to the kind of separation membrane.

Examples of a separation membrane to which the hybrid porous structured material may be applied may be, for example, a microfiltration (MF) membrane, an ultrafiltration (UF) membrane, a nanofiltration (NF) membrane, or a reverse osmotic (RO) membrane.

The porous region in the imaginary spherical body is interconnected to nanopores formed in the imaginary spherical body.

The nanopore size may also be controlled with relative ease. For example, the nanopores may have an average diameter of about 1 nm to about 500 nm.

Figure 1:
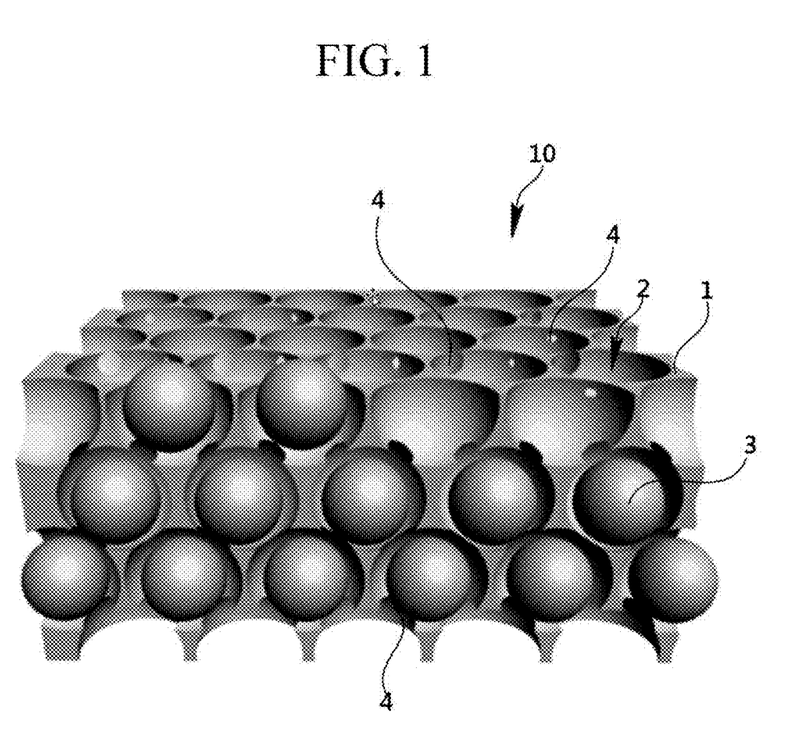
FIG. 1 is a schematic view of a hybrid porous structured material according to one example embodiment of the present disclosure.

FIG. 1 is a schematic view of the hybrid porous structured material 10 according to an example embodiment. As shown in FIG. 1, a spherical colloid particle 3 (e.g., spherical core particle) is positioned inside each of the imaginary spherical bodies 2 (e.g., spherical cavities) in a non-porous template 1 (e.g., base framework), and nanopores 4 are formed at contact/tangential surfaces between adjacent imaginary spherical bodies.

As shown in FIG. 1, a plurality of imaginary spherical bodies 2 are stacked in three-dimensional directions so as to contact each other to form a stacked structure, and a non-porous template 1 fills the gaps between the plurality of imaginary spherical bodies 2.

The imaginary stacked structure may be a closest packing structure where imaginary spherical bodies 2 are stacked. For example, the imaginary stacked structure may form an opal structure. The opal structure is formed by closely packing spherically-shaped structures with a desired or predetermined size. The closely-packed structure may include, for example, a hexagonal closely-packed (hcp) structure and a face-centered cubic (fcc) structure. However, the imaginary spherical bodies 2 may not have a completely spherical shape with a uniform size, or as described above, according to the method of preparing the structured material, nanopores 4 may be provided in the non-porous template 1 at the area where the adjacent imaginary spherical bodies 2 are in contact.

As the size of the nanopores 4 may be affected by the size of the imaginary spherical bodies 2, the size of the nanopores 4 may be controlled by adjusting the size of the imaginary spherical bodies 2.

The hybrid porous structured material 10 may have a porosity of about 0.1 to about 95 volume %. Specifically, the hybrid porous structured material 10 may have a porosity of about 0.5 to about 90 volume %, and more specifically about 1.0 to about 80 volume %.

Since each imaginary spherical body 2 forms a structure that is three-dimensionally interconnected through the nanopores 4, compensation for defects may automatically occur and thus the hybrid porous structured material 10 has an improved effect of separating a target material of a specific size when applied to a separation membrane.

The non-porous template 1 may be formed of any non-porous material capable of being applied to a method of preparing the hybrid porous structured material 10 described later, as well as one that maintains desirable mechanical strength of the hybrid porous structured material 10. For example, according to the method of preparing the hybrid porous structured material 10, a three-dimensional stacked structure is formed with colloid particles, a gap among the colloid particles is filled to form a non-porous region, shell layers of the colloid particles therein are removed, and thereby the non-porous template 1 including the spherical colloid particles 3 are present in the imaginary spherical bodies 2. A material for forming the non-porous template 1 may not be capable of being removed when the shell layers of the colloid particles are removed. The material for forming the non-porous template 1 may not be limited in its kinds as long as those conditions are met, and both of an appropriate non-porous characteristic and mechanical strength are achieved. For example, the non-porous template 1 may be made of a material such as an inorganic oxide, a thermoplastic resin, a curable resin, and the like.

Specific examples of the inorganic oxide of the non-porous template 1 may be titanium oxide, tin oxide, lead oxide, zirconium oxide, nickel oxide, copper oxide, yttrium oxide, magnesium oxide, calcium oxide, aluminum oxide, boron oxide, silicon oxide, zeolite, and the like, and a solution including a precursor thereof may be injected so as to fill a gap between colloid particles forming the stacked structure and then cured by a sol-gel reaction to form a non-porous template 1.

Specific examples of the thermoplastic resin of the non-porous template 1 may be polyamide, polyethylene, polyester, polyisobutylene, polytetrafluoroethylene, polypropylene, polyacrylonitrile, polysulfone, polyethersulfone, polycarbonate, polyethylene terephthalate, polyimide, polyvinylene fluoride, polyvinyl chloride, cellulose acetate, cellulose diacetate, cellulose triacetate, and the like.

The curable resin of the non-porous template 1 may be selected from a thermosetting resin, a photocurable resin, and a combination thereof. As the thermosetting resin and the photocurable resin, any resin known as a thermosetting resin or photocurable resin may be used without limitation. Specifically, a thermosetting resin such as polydimethylsiloxane (PDMS) or a photocurable resin that may be cured by electromagnetic waves such as a UV curable resin may be used. Specific examples of the UV curable resin may be a polyurethane-based resin, a polyacrylate-based resin, a polyepoxy-based resin, a polyurethane acrylate-based resin, a polyester acrylate-based resin, a polyepoxy acrylate-based resin, a silicon-based UV curable resin, and the like.

A thermoplastic resin mixed with a solvent or a curable resin mixed with a solvent, or a liquid phase thermoplastic resin or a liquid phase curable resin in a molten state, may be injected so as to fill a gap between colloid particles forming the stacked structure, and then dried, cooled, or cured to form a non-porous region.

The spherical colloid particle 3 is one prepared by removing a shell layer from the initial colloid particle including the shell layer and a core layer, and the shell layer and the core layer may consist of different compositions from each other as mentioned later.

Specifically, the spherical particles including the shell layer and the core layer are stacked three-dimensionally, a material for a non-porous template 1 is introduced to the stacked structure and cured to provide a non-porous template 1, and then only the shell layer of the colloid particle is removed to provide the hybrid porous structured material 10.

Accordingly, the material for the shell layer of the colloid particles is different from the material for the non-porous structured material, so the material for the non-porous template 1 may not be removed when the shell layer is removed.

Thus, the shell layer consists of different materials from the material for the non-porous template 1, and may include any kind of materials as long as only the shell layer may be removed with relative ease while maintaining the material for the non-porous template 1.

For example, when the material for the non-porous template 1 includes the thermoplastic resin or the curable resin, the shell layer of the colloid particles may include an inorganic oxide. For example, the shell layer of the colloid particles may consist of silica.

When the material for the non-porous template 1 includes the inorganic oxide, the shell layer of the colloid may consist of a second inorganic oxide different from the inorganic oxide under the condition that the inorganic oxide for the non-porous template 1 is not dissolved when dissolving other materials, particularly, the shell layer.

The material for a core of the colloid particles is different from the material for the shell layer, and may include any materials without limitation as long as it is not removed when removing the shell layer. As in the material for the non-porous template 1, the core helps to maintain the mechanical strength of the hybrid porous structured material 10, and it may also be applied to the method of preparing a hybrid porous structured material 10 as described later.

Specifically, the material for the core layer of the colloid particles may be the same as in the material for the non-porous template 1, but the thermoplastic resin, curable resin, or combination thereof for the non-porous template may be used rather than using the inorganic oxide, considering the preparation process.

As the hybrid porous structured material 10 may finely control the sizes of the macropores and the nanopores 4 by the presence of the material for the non-porous template 1 and the colloid particles present in the porous region therein, it may be applied to a nanofiltration membrane (NF) based on the steric exclusion effect and Donnan exclusion effect or to an ultrafiltration membrane (UF) capable of removing smaller impurities. In addition, the hybrid porous structured material 10 may be effectively operated with a relatively low applied pressure and may have improved mechanical stability, and thus may be used as a material for a next generation water treatment separation membrane. Further, the hybrid porous structured material 10 may be used to treat sewage/waste water, processing of foods, separation of oils, and the like by selectively separating microorganisms and environmental materials, and accordingly may be widely applied to fiber and paper industries, water treatment, diary and agriculture facilities, and the like.

In order to be applied for a separation membrane, the hybrid porous structured material 10 may have a form of a membrane having two surfaces facing each other and a particular thickness, wherein the two surfaces may be formed to provide a relative area occupied by each non-porous template 1 at about 1 to about 95% of an imaginary plane contacting one surface of the membrane and to provide a wall surface of a membrane in a thickness direction so that macropores for the imaginary spherical body are not exposed. For example, in each of the two surfaces, the relative area occupied by the non-porous template 1 may be about 10 to about 75%, for example, about 20 to about 50%, of the imaginary plane contacting one surface of the membrane.

The hybrid porous structured material 10 may be formed as a membrane having a thickness of about 10 nm to about 1000 µm. If the thickness of the membrane is increased, mechanical strength may be increased, but a relatively high applied pressure may accordingly be required. As such, the thickness of the membrane may be controlled so as to have desired characteristics according to the use of the membrane. For example, the membrane may have a thickness of about 100 nm to about 500 µm. As another example, the membrane may have a thickness of about 1000 nm to about 250 µm.

Figure 3:
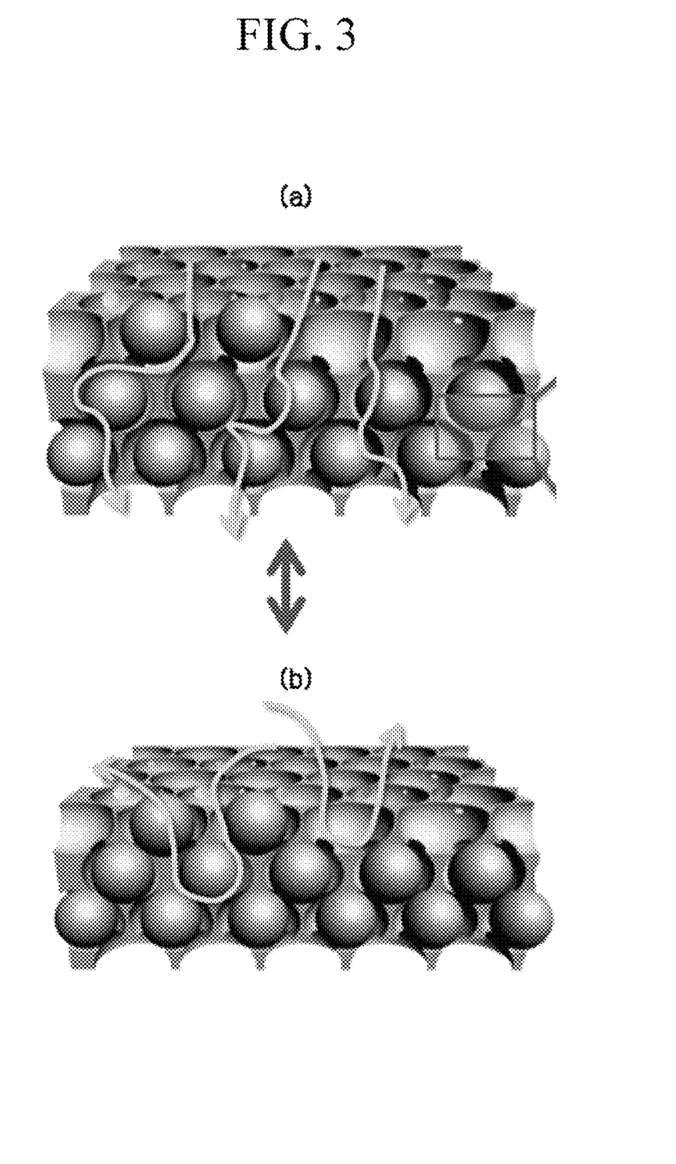
FIG. 3 is a schematic view showing a water permeation process using a hybrid porous structured material according to one example embodiment of the present disclosure.

FIG. 3 is a schematic view showing a water permeation phenomenon using the hybrid porous structured material according to one example embodiment.

As shown in FIG. 3, water may flow in through macropores in the porous structured material and be discharged through nanopores connecting between macropores in the hybrid porous structured material.

Figure 4:
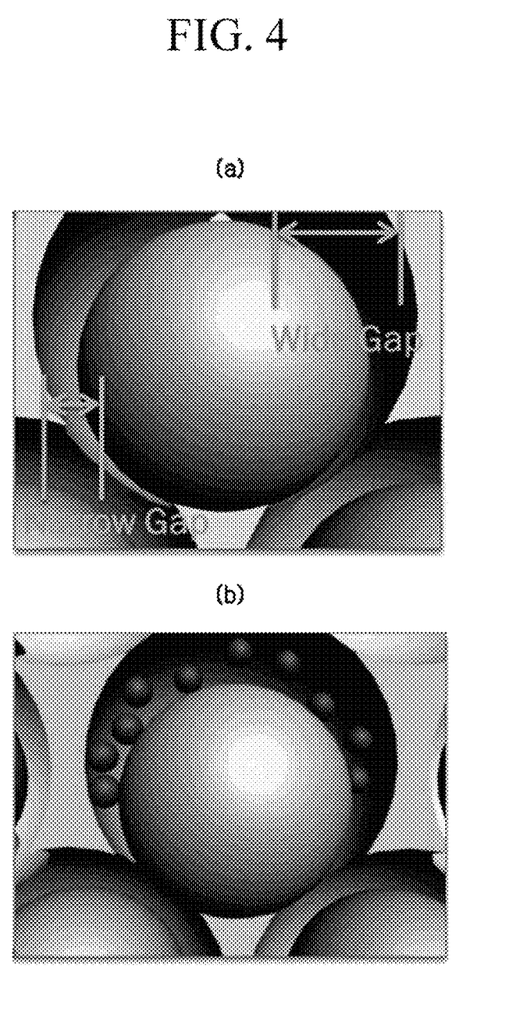
FIG. 4 is an enlarged view of a part of the hybrid porous structured material (part shown in a box in FIG. 3), wherein (a) of FIG. 4 is a schematic view showing the positional relationship and morphology of macropores in the structured material and colloid particles present therein, and (b) of FIG. 4 is a schematic view showing that impurities are removed thereby.

FIG. 4 is a schematic view showing salt being removed by the hybrid porous structured material.

First, (a) of FIG. 4 is an enlarged view of a part of the hybrid porous structured material shown in FIG. 3. In the drawing, a colloid particle is present in a macropore, and the size and shape of a porous region in the macropore is changed according to the position and morphology between the colloid particle and the macropore. Thus, referring to (b) of FIG. 4, the impurities included in water may flow in the macropore of the porous structured material, but it is difficult for the impurities to pass through the macropore and flow into another macropore since the nanopore connecting the adjacent macropore to the macropore is blocked by the presence of colloid particles in the macropore.

According to the principle, the hybrid porous structured material according to one example embodiment may effectively permeate water and filter impurities in water according to size. Even in the case that the impurities flow into the macropores, the impurities may not flow out from the hybrid porous structured material and are filtered according to size.

According to yet another example embodiment of the present disclosure, a membrane including a membrane formed of the hybrid porous structured material 10 is provided.

The separation membrane may be manufactured into a microfiltration membrane (MF), an ultrafiltration membrane (UF), a nanofiltration membrane (NF), or a reverse osmotic membrane (RO) by controlling the pore structure including the macropores and the nanopores 4 as needed.

The separation membrane may be manufactured into a single membrane or a composite membrane further including a heterogeneous material membrane. For example, the separation membrane may be a single membrane formed of the hybrid porous structured material 10 (hereinafter referred to as a "hybrid porous structured material membrane"). If the separation membrane is a composite membrane, it may be, for example, a composite membrane including a support layer bonded to the hybrid porous structured material membrane. The shape and kind of the support layer are not specifically limited, and a layer formed by a known method using a known material may be used.

When the separation membrane is a composite membrane, the thickness of the hybrid porous membrane is as explained above, and the thickness of the support layer may be about 200 µm to about 500 µm, for example about 100 µm to about 250 µm, or about 50 µm to about 125 µm.

The support layer may be manufactured according to whether a membrane to be manufactured is a microfiltration (MF) membrane, an ultrafiltration (UF) membrane, a nanofiltration (NF) membrane (NF), or a reverse osmosis (RO) membrane. The separation membrane may be provided in the various kinds and may be applied to the usages of removing and separating impurities having various sizes by providing the size of nanopores variously and uniformly.

The support layer may be manufactured by including one selected from a polyacrylate-based compound, a polymethacrylate-based compound, a polystyrene-based compound, a polycarbonate-based compound, a polyethylene terephthalate-based compound, a polyimide-based compound, a polybenzimidazole-based compound, a polybenzthiazole-based compound, a polybenzoxazole-based compound, a polyepoxy-based resin compound, a polyolefin-based compound, a polyphenylene vinylene compound, a polyamide-based compound, a polyacrylonitrile-based compound, a polysulfone-based compound, cellulose-based compound, polyvinylidene fluoride (PVDF), polytetrafluoroethylene (PTFE), a polyvinyl chloride (PVC) compound, or a combination thereof.

According to another example embodiment of the present disclosure, a method of preparing a hybrid porous structured material may include stacking a plurality of spherical particles including a core layer and a shell layer formed on the surface of the core layer so as to contact each other in three-dimensional directions; injecting a liquid material for a non-porous membrane to fill gaps between the plurality of spherical particles and curing the same to provide a non-porous structured material; and removing the shell layer of the spherical particles.

In the method, when removing the shell layer of the plurality of spherical particles, in order to not remove the non-porous structured material injected for filling gaps between the plurality of spherical particles, the material for the shell layer of the spherical particles may be different from the material for the non-porous structured material.

In addition, in the method, in order to provide the core layer of the plurality of spherical particles in macropores of the structured material, the material for the core layer of the spherical particle is different from the material for the shell layer.

The preparing method may further include removing a part of the non-porous structured material to expose a part of the plurality of spherical particles in the structured material after providing the non-porous structured material.

In other words, the non-porous structured material may be prepared according to dip coating in which the stacked structure of the spherical particles is dipped in a solution for the non-porous structured material. In this case, the spherical particles are entirely coated with the material for the non-porous structured material. In this case, the shell layer of the spherical particle is hardly removed since is coated with the material for a non-porous structured material, so the shell layer of the particles may be removed in a state that a part of the structured material is removed to expose the spherical particle.

Figure 2:
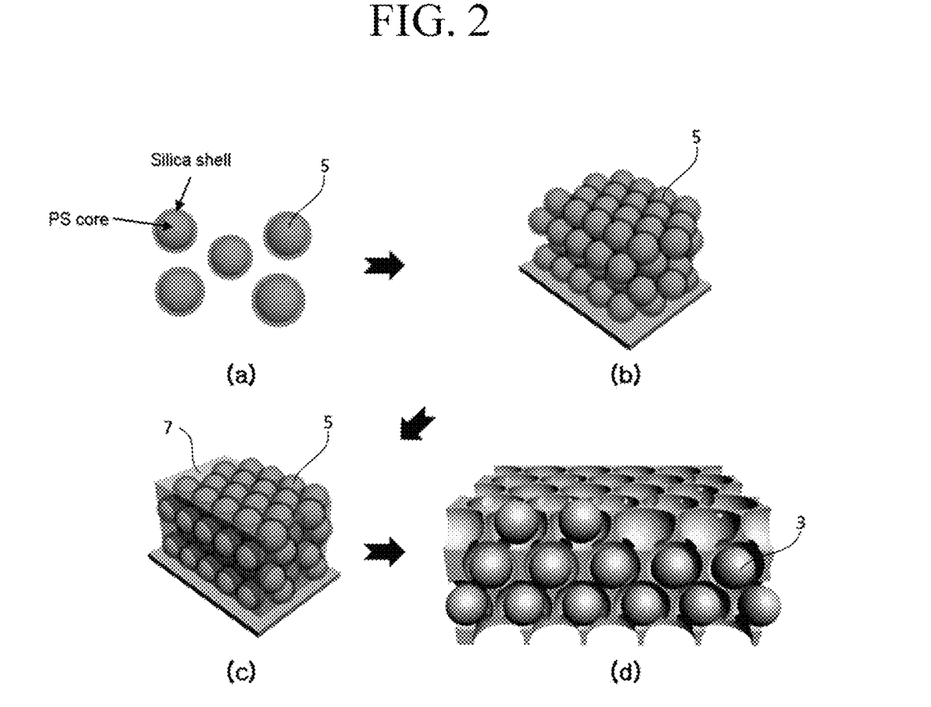
FIG. 2 schematically shows a method of preparing the hybrid porous structured material according to one example embodiment of the present disclosure.

FIG. 2 schematically shows each step of the preparation method of the hybrid porous structured material.

Referring to FIG. 2, a plurality of spherical particles including a shell layer and a core layer (FIG. 2(a)) for providing macropores (e.g., spherical cavities) are stacked so as to contact each other in three-dimensional directions to provide a stacked structure (FIG. 2(b)); a liquid material for a non-porous template is injected to fill gaps between the plurality of spherical particles 5 for the stacked structure and coated and then cured to provide a non-porous structured material (FIG. 2(c)); and only the shell layer of the spherical particles 5 for forming the macropores is dissolved from the non-porous structured material to provide core particles in each of the plurality of spherical macropores (FIG. 2(d)).

Specifically, spherical particles 5 for the macropores are stacked so as to contact each other in three-dimensional directions to provide a stacked structure. As shown in FIG. 2(a), the spherical particles 5 for the macropores include a shell layer and a core layer. In FIG. 2(b), the spherical particles 5 for the macropores are formed as a stacked structure having an opal structure. As described above, the size of the spherical body shaped particles 3 may be determined according to a pore density per unit area of the hybrid porous structured material. For example, the average diameter of the spherical body shaped particle 5 may be about 1 nm to about 100 µm, for example about 10 nm to about 10 µm, or about 100 nm to about 1 µm. The shapes of the spherical body shaped particles 5 and the stacked structure thereof are the same as described in the spherical shaped structure and stacked structure explained for the shape of the porous region of the hybrid porous structured material. For example, the spherical body shaped particles 5 may form an opal structure while having the above size range.

The shell layer of spherical particles 5 for macropores may include any material without limitations as long as it may be selectively removed after providing a non-porous template. For example, an organic polymer material such as polystyrene (PS) and polymethylmethacrylate (PMMA) is used for a core layer, and a shell layer of an inorganic oxide such as silica ($SiO_2$) is coated thereon to provide the spherical particles 5. In addition, in order to diminish the size deviation among spherical particles 5, colloid particles may be used as the spherical particles 5. Specifically, the opal structure of colloid particles having a crystal lattice may be prepared by using a colloid particle in which an organic polymer core such as polystyrene (PS) or polymethylmethacrylate (PMMA) is coated with a shell layer of an inorganic oxide such as silica ($SiO_2$) as the spherical particle 5, and by using spin coating, dip coating, sedimentation, a spray method, a coating method using external stimulation such as electrophoresis, and the like, a Langmuir-Blodgett (LB) method, a form-guide method, and the like.

The thickness of the membrane of the membrane-shaped hybrid porous structured material may be variously controlled by adjusting the concentration of solution used for providing a stacked structure of spherical particles 5 for the macropores. For example, according to the concentration of a solution including spherical particles 5 for macropores, the stacked structure of spherical particles 5 for macropores may be prepared to provide a thickness of about 10 nm to about 1000 µm. For specific examples, by using the solution of polystyrene polymer colloid particles in a concentration of about 0.1 wt % to about 10 wt %, the stacked structure of the opal structure may have a thickness of about 500 nm to about 100 µm.

A liquid phase material 7 for forming a non-porous template is injected so as to completely fill the gap between the spherical body shaped particles 5 of the stacked structure, thereby forming a structure of FIG. 2 (c). The liquid phase material 7 for forming a non-porous template may include a thermoplastic resin, a curable resin, or an inorganic oxide precursor solution, and the detailed description is as explained in the non-porous template included in the hybrid porous structured material. A method for injecting the liquid phase material 7 for forming a non-porous region may include spin coating, capillary filling, dip coating, a spray method, and the like, but is not limited thereto.

Now, the shell layer of the spherical particle is to be removed, but the shell layer of the spherical particle is not easily removed under the condition that the material for the non-porous template is coated on the entire stacked structure of the spherical particles. Accordingly, in this case, the shell layer of the particle may be removed in a state that a part of the structured material is removed on the surface of the membrane of the structured material to expose the spherical particles 5. Such process is also required for providing a membrane of a hybrid porous structured material having a form of a free-standing thin membrane opening both surfaces of the separation membrane.

Subsequently, only the shell layer of spherical particle 5 is removed by using a solvent capable of selectively dissolving and removing only the shell layer of the spherical particle 5; by irradiating UV capable of selectively removing only the shell layer; or by using a chemical reaction or the like using a radical using gas plasma, so a hybrid porous structured material having a colloid particle 3 including a core layer of spherical particle in macropore in the porous structured material is prepared (FIG. 2 (d)). For example, when the shell layer of the spherical particle 5 is $SiO_2$, the shell layer may be removed by using fluoric acid (HF); and when the shell layer of the spherical particle 5 is an organic colloid particle such as polystyrene, the shell layer may be removed by using an organic solvent such as toluene. Further, only the shell layer may be selectively removed by different methods according to the kind of the used inorganic oxide or organic colloid.

By controlling how many pores are exposed on the surface of the membrane of the hybrid porous structured material, the relative area occupied by the non-porous template on one surface of the finally obtained thin film is about 1 to about 95%, for example, about 10 to about 75%, or for example, about 20 to about 50% of the imaginary plane contacting one surface of the membrane of the hybrid porous structured material.

In FIG. 2 (d), the small points marked in the macropores refer to nanopores connecting between macropores.

In the structured material, as the spherical colloid particles are prepared by removing the shell layer of a plurality of spherical particles introduced for providing macropores, the particles are present in a form of being freely movable in the macropores. In addition, by removing the shell layer, at least one nanopore is provided in the area where the macropores are connected.

In another example embodiment of the present disclosure, a water treatment device including the separation membrane is provided. The water treatment device may be a reverse osmosis water treatment device.

Hereinafter, the present disclosure is illustrated in more detail with reference to the following examples. However, it should be understood that these examples are not limiting to the present disclosure.

EXAMPLES

Example 1

Using a particle coated with silica ($SiO_2$) in a thickness of 230 nm on a surface of a polystyrene core having a size of 670 nm, an opal structured material having a high degree of a crystal lattice shape is prepared according to sedimentation. Polyurethane acrylate is injected into the obtained opal structured material according to a spin coating method (1500 rpm, 5 min). In order to provide a free standing thin membrane in which both surfaces of the inverse-opal structured thin membrane are opened, a spin coating method (1500 rpm, 60 sec) is repeated three times using ethanol (20 v/v % and deionized water (DI)) to remove polyurethane acrylate present in an excessive amount on the surface, so that the surface is planarized. Subsequently, under an ultraviolet (UV) exposure condition, it is cured for 2 hours 30 minutes to provide an inverse-opal polyurethane acrylate non-porous template, and then is dipped in hydrofluoric acid (HF) for 1 hour to remove silica on the particle surface for the opal structured material. Thus, a porous structured material having polystyrene colloid particles in inverse-opal macropores is prepared.

Figure 5:
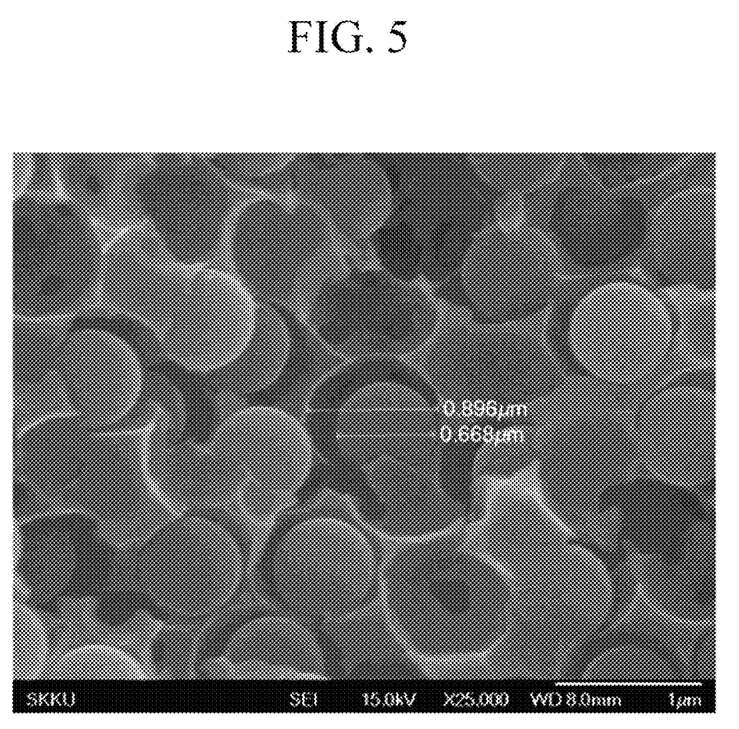
FIG. 5 is a scanning electron microscope (SEM) photograph of a hybrid porous structured material according to an example embodiment of the present disclosure.

FIG. 5 is a scanning electron microscope (SEM) photograph showing a cross-sectional surface of a hybrid porous structured material prepared according to an example embodiment.

Example 2

Figure 6:
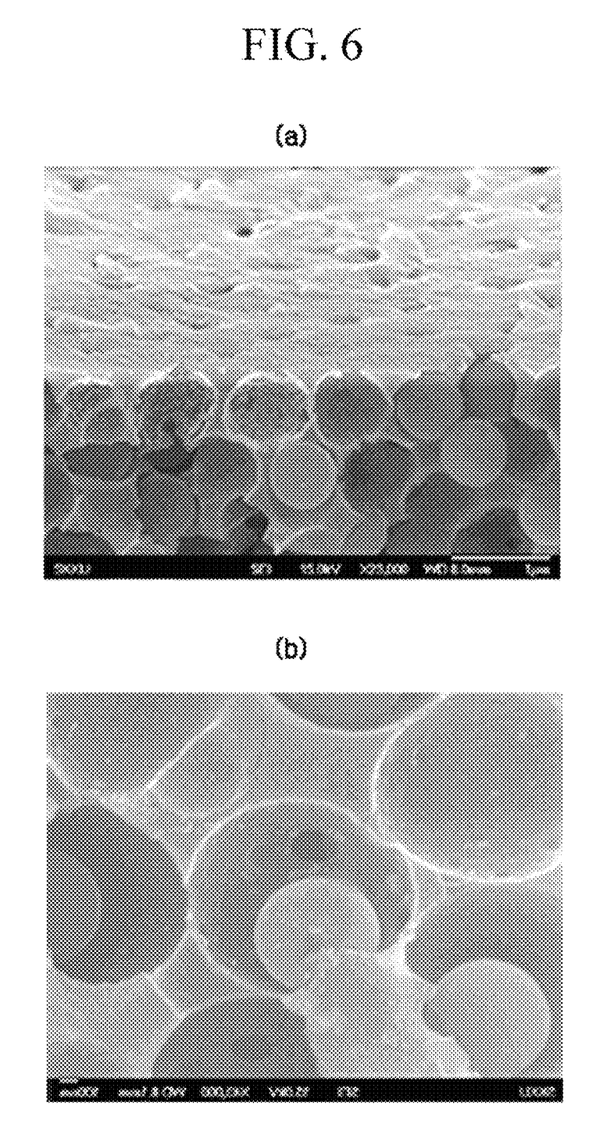
FIG. 6 shows scanning electron microscope (SEM) photographs of two kinds of hybrid porous structured materials in which the diameter ratio of colloid particles present in the porous region of the hybrid porous structured material is changed according to Example 2 ((a) of FIG. 6) and Example 3 ((b) of FIG. 6).

In order to provide a diameter ratio of the polystyrene core to the entire particle of 0.80, a hybrid porous structured material is prepared in accordance with the same procedure as in Example 1, except using a polystyrene core having a size of 320 nm and nanoparticles coated with a silica ($SiO_2$) layer in a thickness of 80 nm. FIG. 6 (a) shows a SEM photograph of the obtained hybrid porous structured material.

Example 3

In order to provide a diameter ratio of the polystyrene core to the entire particle of 0.64, a hybrid porous structured material is prepared in accordance with the same procedure as in Example 1, except using a polystyrene core having a size of 320 nm and nanoparticles coated with a silica ($SiO_2$) layer in a thickness of 180 nm. FIG. 6 (b) shows a SEM photograph of the obtained hybrid porous structured material.

Experimental Example 1

Water including gold (Au) particles having a size of 20 nm is passed through each hybrid porous structured material obtained from Example 2 and Example 3, and then the concentration of gold particles is measured using UV/Vis absorption spectrum. The results are shown in the graphs of FIG. 7.

Figure 7:
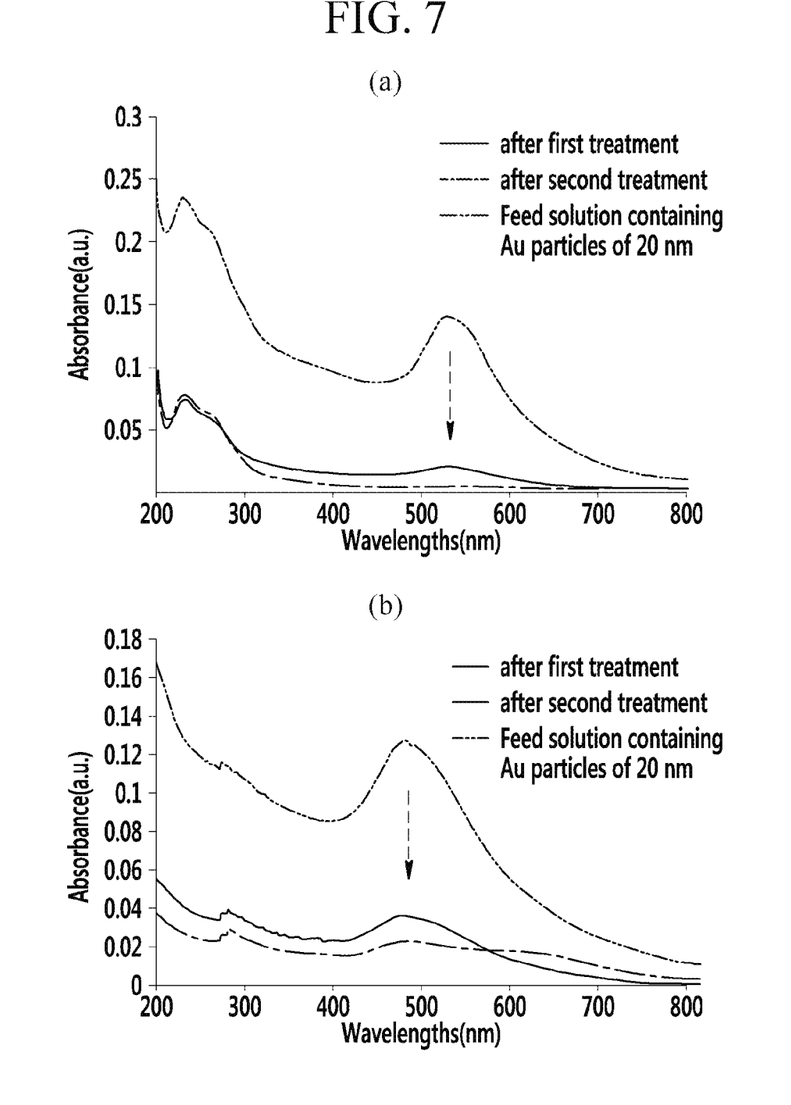
FIG. 7 shows graphs of salt rejection using two kinds of hybrid porous structured materials shown in FIG. 6, wherein FIG. 7 (a) shows salt rejection using the hybrid porous structured material shown in (a) of FIG. 6, and FIG. 7 (b) shows salt rejection using the hybrid porous structured material shown in (b) of FIG. 6.

FIG. 7 (a) shows the results using the hybrid porous structured material obtained from Example 2, and FIG. 7 (b) shows the results of the case that gold is removed using the hybrid porous structured material obtained from Example 3.

As understood from the graph, by controlling the size of colloid particles in macropores in the porous structured material, the pore size of macropores may be adjusted to control the impurity removal efficiency. In other words, as the size of the porous region in the macropores is smaller, the removal rate of gold (Au) particles having a size of 20 nm may be increased with relative ease. When using the porous structured material according to Example 2, the removal rate is about 95-99%, and when using the porous structured material according to Example 3, the removal rate is about 70-85%.

Experimental Example 2

A hybrid porous structured material is prepared in accordance with the same procedure as in Example 1, except for changing the ratio of the polystyrene (PS) core to the entire particle size to provide a hybrid porous structure including colloid particles with various sizes. The water permeation amount and the salt rejection are measured for each case, and the results are shown in FIG. 8.

Figure 8:
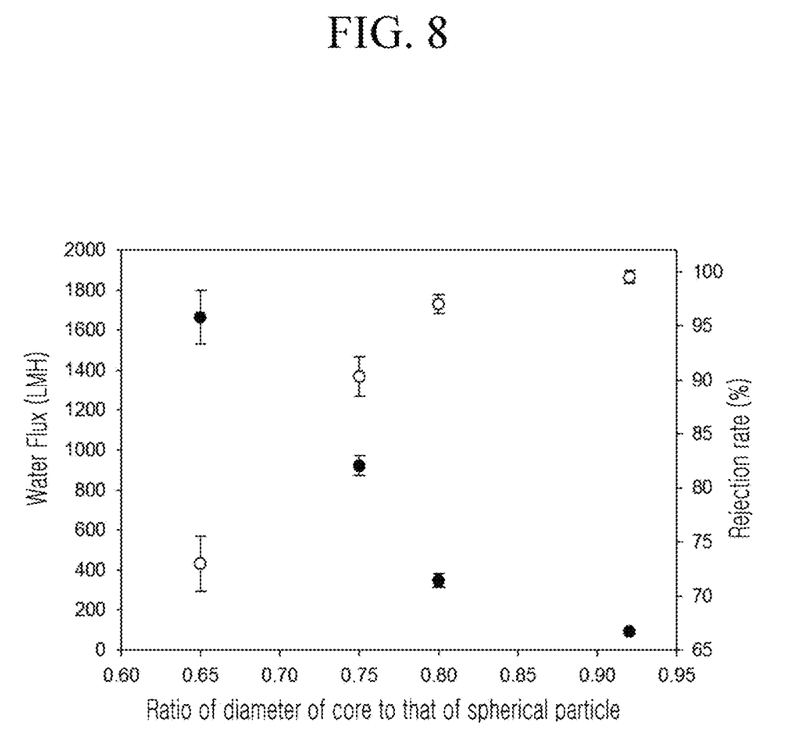
FIG. 8 is a graph showing a change of water flux and rejection rate of a hybrid porous structured material according to the size of colloid particles included in the hybrid porous structured material according to one example embodiment of the present disclosure.

As shown in FIG. 8, it is understood that the permeated water amount is gradually decreased as the core size is increased with respect to the entire particle size; that is, when the relative size of the colloid particles in the macropores is increased by providing the silica shell layer with a gradually thinner thickness. On the other hand, it is understood that the salt rejection is gradually increased when increasing the core size compared to the entire particle size, that is, when the size of the colloid particles in the macropores is relatively increased by providing the silica shell layer with a gradually thinner thickness.

In other words, it is understood that the permeated water amount and the salt rejection have a trade-off relationship with each other, but when a ratio of the core to the entire nanoparticle size is about 0.75, the permeated water amount is high at greater than or equal to about 900 LMH while the salt rejection is greater than or equal to about 90%.

Therefore, it is understood that the hybrid porous structured material according to one example embodiment of the present disclosure may uniformly control the size of macropores and nanopores with relative ease so as to accomplish both improved water permeation and salt rejection.

In addition, as the porous structured material may control the size of the porous region in the macropores with relative ease according to the kind of subject to be separated, it may be effectively used for effectively removing various kinds of impurities in various fields.

Furthermore, the porous structured material according to one example embodiment of the present disclosure may also improve the mechanical strength of the separation membrane due to the presence of colloid particles in the macropores compared to the case of including only macropores or the case of introducing a polymer layer in the macropores.

While this disclosure has been described in connection with various example embodiments, it is to be understood that the present application is not limited to the disclosed embodiments, but, on the contrary, is intended to cover various modifications and equivalent arrangements included within the spirit and scope of the appended claims.

What is claimed is:

1. A hybrid porous structured material, comprising:
a base framework defining a plurality of spherical cavities therein, the plurality of spherical cavities being adjacent to and in communication with each other via nanopores, the base framework including at least one of a thermoplastic resin and a curable resin; and
a spherical core particle in each of the plurality of spherical cavities, the spherical core particle in each of the plurality of spherical cavities having a diameter smaller than a diameter of the spherical cavities and larger than a diameter of the nanopores, the spherical core particle in each of the plurality of spherical cavities including at least one of a thermoplastic resin and a curable resin, the spherical core particle occupying at least 60% of a volume of a respective spherical cavity of the plurality of spherical cavities.

2. The hybrid porous structured material of claim 1, wherein the plurality of spherical cavities are disposed in a closest packing arrangement.

3. The hybrid porous structured material of claim 1, wherein the nanopores coincide with tangential portions of adjacent spherical cavities.

4. The hybrid porous structured material of claim 3, wherein the nanopores have an average diameter of about 1 nm to about 500 nm.

5. The hybrid porous structured material of claim 1, wherein the plurality of spherical cavities have an average diameter of about 10 nm to about 100 μm.

6. The hybrid porous structured material of claim 1, wherein the hybrid porous structured material has a porosity of about 0.1 to about 95 volume %.

7. The hybrid porous structured material of claim 1, wherein the hybrid porous structured material has opposing surfaces bounded by two planes, a distance between the opposing surfaces corresponding to a thickness of the hybrid porous structured material, each of the opposing surfaces including a cross-section of the base framework and the plurality of spherical cavities.

8. The hybrid porous structured material of claim 7, wherein the cross-section of the base framework in each of the opposing surfaces occupies about 1 to about 95% of a total area of each of the opposing surfaces.

9. The hybrid porous structured material of claim 7, wherein side wall surfaces of the base framework are non-porous, the side wall surfaces being between the opposing surfaces.

10. The hybrid porous structured material of claim 7, wherein the thickness is about 10 nm to about 1000 μm.

11. A separation membrane comprising the hybrid porous structured material according to claim 1.

12. A composite membrane comprising:
   the separation membrane of claim 11; and
   a support layer.

13. A water treatment device comprising the separation membrane according to claim 11.

* * * * *